(12) United States Patent
Kramarz-Von Kohout

(10) Patent No.: US 7,299,061 B2
(45) Date of Patent: Nov. 20, 2007

(54) METHOD FOR STORING SHORT DATA

(75) Inventor: Gerhard Kramarz-Von Kohout, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 10/490,472

(22) PCT Filed: Sep. 23, 2002

(86) PCT No.: PCT/DE02/03559

§ 371 (c)(1),
(2), (4) Date: Oct. 14, 2004

(87) PCT Pub. No.: WO03/028391

PCT Pub. Date: Apr. 3, 2003

(65) Prior Publication Data

US 2005/0064881 A1    Mar. 24, 2005

(30) Foreign Application Priority Data

Sep. 24, 2001 (DE) .................... 101 46 878

(51) Int. Cl.
 *H04Q 7/20* (2006.01)
 *H04L 12/58* (2006.01)
(52) U.S. Cl. .................... 455/466; 455/412.2
(58) Field of Classification Search .............. 455/412.2, 455/412.1, 458, 558, 435.3, 432.3, 560, 567, 455/466, 404.1, 414.1, 456.1, 566
See application file for complete search history.

(56) References Cited

U.S. PATENT DOCUMENTS

| 6,246,871 B1 | 6/2001 | Ala-Laurila |
| 2002/0086659 A1* | 7/2002 | Lauper ...................... 455/404 |
| 2002/0090934 A1* | 7/2002 | Mitchelmore ............... 455/412 |
| 2003/0016639 A1* | 1/2003 | Kransmo et al. ........... 370/335 |
| 2003/0194990 A1* | 10/2003 | Helferich ................. 455/412.2 |
| 2004/0266397 A1* | 12/2004 | Smith et al. ............ 455/412.1 |
| 2005/0002510 A1* | 1/2005 | Elsey et al. ............ 379/201.01 |
| 2005/0070315 A1* | 3/2005 | Rai et al. ...................... 455/466 |
| 2005/0075097 A1* | 4/2005 | Lehikoinen et al. ..... 455/414.1 |
| 2005/0075106 A1* | 4/2005 | Jiang ........................ 455/432.3 |
| 2005/0107128 A1* | 5/2005 | Deeds ........................ 455/567 |

FOREIGN PATENT DOCUMENTS

| DE | 196 54 859 C1 | 12/1998 |
| DE | 198 57 901 A1 | 6/2000 |
| DE | 198 57 902 A1 | 6/2000 |
| DE | WO 01/17302 A1 * | 3/2006 |
| EP | 0989763 A | 3/2000 |
| WO | WO 00/39993 A1 | 7/2000 |
| WO | WO 01/03011 A2 | 1/2001 |
| WO | WO 01/35622 A1 | 5/2001 |

OTHER PUBLICATIONS

SMALE, *Hp OpenMail Short Message Service (SMS) Gateway: The Mobile Phone As An E-mail 'Client Of Choice'*, International Workshop On Mobile Multi-Media Communications, pp. 1-6, Apr. 1995.
WEB.DE FreeMail-HiLfe, [online], Retrieved from the Internet: <http://hilfe.web.de/freemail/Hilfe/Inhalt/Optionen/> (and an English translation of the important parts), [retrieved on Apr. 25, 2002].

* cited by examiner

*Primary Examiner*—Naghmeh Mehrpour
(74) *Attorney, Agent, or Firm*—Browdy and Neimark, PLLC

(57) ABSTRACT

The invention concerns a method for storing short alphanumerical data determined for a subscriber mobile terminal of mobile radiotelephony, characterized in that said short alphanumerical data are simultaneously and automatically duplicated, independently of their reception, via the air interface, converted into an electronic mail, and stored as such in an electronic mailbox of the mobile radiotelephone subscriber.

9 Claims, No Drawings

METHOD FOR STORING SHORT DATA

The invention is concerned with a process for storing short messages, according to the preamble of claim 1.

Processes for storing short messages, generally referred to as SMS messages, are known, wherein the subscriber sends an SMS message that was received on a mobile communications terminal to a service provider, e.g., via the "forward" function. There, these SMS messages are stored in a password-protected memory and can be called up, processed, printed or deleted over the Internet by the subscriber at any time.

This process has the shortcoming that storage spaces for SMS messages in mobile communications terminals or on the SIM card are available only to a limited extent. Usually, when a new SMS message arrives and the memory locations are full, the oldest SMS message is deleted, or this new SMS message is stored only after the subscriber has freed up at least one memory location through manual deletion. This means that prior to forwarding the SMS message to the external memory at the service provider's, at least one memory location must be available in the mobile communications terminal, or the loss of the oldest message stored in the mobile communications terminal must be accepted without being able to verify whether this oldest message already exists in the external memory. A further shortcoming lies in the fact that the accompanying information of the SMS message, such as the sender's telephone number, date, and time, are lost due to the forwarding, or overwritten with the own telephone number and time of forwarding.

It is the object of the invention to permit an automatic and therefore secure storing of all short messages sent by a subscriber and/or sent to a subscriber, independently from the degree of storage utilization in the mobile communications terminal.

This object is met with the characteristics specified in the independent claim.

Advantageous embodiments of this invention are contained in the subclaims.

The invention has the advantage that the short messages are stored securely and reliably within the subscriber's access range even when the mobile communications paths are disturbed. Since the short messages are saved as e-mails directly in a predetermined e-mail box of the mobile communications subscriber as the recipient, this message can be read out and processed without difficulty and inexpensively without requiring further conversion.

Additionally, the automatic duplicating of the SMS message eliminates the manual, hence time-consuming, and expensive forwarding to the external memory since a fee would customarily be charged by the mobile network operator for transmitting a short message from a mobile communications terminal according to the prior art. An unintentional omission to save the short message and, therefore, the loss of potentially important messages, especially when the storage space in the mobile communications terminal is full, is no longer possible.

Furthermore, it is an advantage of the invention that even when a mobile communications terminal is defective, the short messages safely reach the subscriber as e-mails and can then be sent to the subscriber, or called up by him, over the Internet, as short messages (e.g., SMS messages) to a different mobile communications address, as spoken e-mails to a fixed network connection, as printed correspondence (e.g., facsimile), or in other possible formats, depending on the settings of the e-mail box.

Because of the option to store the sent short messages externally, they can also be archived without gaps, without the number of short messages being limited by the internal storage space of the mobile communications terminal.

The invention will be explained in more detail below, with the aid of on an example embodiment.

An SMS message to a mobile communications subscriber is duplicated at a central facility within the recipient's mobile network prior to or concurrently with its transmission via the air interface to the mobile communications terminal, converted into an e-mail, forwarded to a personal e-mail box of the mobile communications subscriber's and stored there. This e-mail box can be accessed in a known manner both via the mobile network, as well as via the fixed network, and readout of the e-mails takes place in a known manner by means of a computer, fixed network telephone, or mobile communications terminal, as voice output or alphanumeric output on a display or monitor, or processing takes place by means of the keyboards of the above devices or by voice commands. It is not necessary for the e-mail box to be tied to a certain network operator.

After the mobile communications subscriber has activated the service "Notification per SMS of Received E-Mails", SMS messages that have been duplicated and converted into e-mails, are either recognized already in the e-mail box based on their source data, and a notification does not occur, or the notification is suppressed at the central facility of the mobile network. It is also possible to deactivate the "Notification" service per control command from the central facility only for the duplicated SMS messages.

At the central facility, those SMS messages are also recognized that signal the arrival of an original e-mail at the mobile communications terminal, since its origin is the mobile communications subscriber's own e-mail box. These SMS messages are excepted from the duplication.

Without these measures, an endless notification and storage loop would result with simultaneous use of the service "Notification per SMS of Received E-Mails" and the inventive process.

The term SMS message used here generally also includes EMS (Enhanced Messaging Service) messages, which serve, for example, to transmit logos, ring tones, formatted text messages and similar messages, and may consist of multiple SMS messages. The invention may furthermore find application with the even more complex MMS (Multimedia Messaging Service) messages, e.g., for image transmission within the UMTS technology.

The storing of sent SMS messages in an e-mail box that is assigned to mobile communications subscribers sending these messages takes place in an analogous manner, with the central facility then being located at the end of the air interface located away from the mobile communications subscriber within the mobile network.

Assignment of the e-mail boxes to the respective mobile communications subscribers may take place through the mobile communications subscribers themselves by means of an SMS message, per Internet, telephonically, in writing, etc., and a password may optionally be used as well.

What is claimed is:

1. A process for storing short messages, such as SMS messages, EMS messages, or MMS messages that are intended for a mobile communications terminal of a mobile communications subscriber's, characterized in that the short messages sent to a mobile communications terminal are concurrently and automatically duplicated independently from their receipt at the mobile communications terminal via the air interface, and converted into an e-mail and stored as such in a predetermined email box of the mobile communications subscriber's within any random message system.

2. A process according to claim 1, characterized in that the sent short messages are stored in the e-mail box that is assigned to the mobile communications subscriber sending these short messages.

3. A process according to claim 1, characterized in that the received short messages are stored in the email box that is assigned to the mobile communications subscriber for whom the short messages are intended.

4. A process according to claim 2, characterized in that those short messages that signal the arrival of any email in the e-mail box are excepted from duplication.

5. A process according to claim 2, characterized in that the sending of a short message to the mobile communications terminal to signal the arrival of an e-mail does not occur if this e-mail is a duplicated and converted short message.

6. A process according to claim 1, characterized in that the assignment of the email box to the respective mobile communications subscribers takes place by these subscribers themselves.

7. A process according to claim 3, characterized in that those short messages that signal the arrival of any e-mail in the e-mail box are excepted from duplication.

8. A process according to claim 3, characterized in that the sending of a short message to the mobile communications terminal to signal the arrival of an e-mail does not occur if this e-mail is a duplicated and converted short message.

9. A process for storing short messages that are intended for a mobile communications terminal of a mobile communications subscriber in a mobile network having a central facility, said process comprising:

sending a short message to the mobile communications terminal;

at the central facility, concurrently and automatically duplicating the short message independently of its receipt at the mobile communications terminal and converting the short message into an e-mail; and storing the e-mail as such in a predetermined e-mail box of the mobile communications subscriber.

* * * * *